United States Patent
Bode et al.

(10) Patent No.: US 8,247,051 B2
(45) Date of Patent: *Aug. 21, 2012

(54) CURABLE POLYMERIC WATER BASED COATING COMPOSITIONS AND RESULTING COATINGS WITH BARRIER PROPERTIES FOR GASES AND LAMINATE STRUCTURES

(75) Inventors: Daniel Bode, Cleveland, OH (US); Cathy Li, Brecksville, OH (US); Kenneth J. Gardner, Middleburg Heights, OH (US)

(73) Assignee: The Glidden Company, Strongsville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/497,003

(22) Filed: Aug. 1, 2006

(65) Prior Publication Data

US 2007/0031673 A1    Feb. 8, 2007

(51) Int. Cl.
*B32B 27/08* (2006.01)
*B32B 27/32* (2006.01)
*B32B 27/34* (2006.01)
*B32B 27/36* (2006.01)
*B32B 27/38* (2006.01)

(52) U.S. Cl. ............ 428/36.7; 428/35.7; 428/36.6; 428/195.1; 428/201; 428/206; 428/207; 428/413; 428/414; 428/416; 428/418; 428/458; 428/461; 428/474.4; 428/480; 428/500; 528/99; 528/101; 528/103; 528/104; 528/106; 528/211; 528/116; 528/117; 528/118; 528/119; 528/419; 528/421; 528/422; 528/423; 524/261; 524/417

(58) Field of Classification Search .............. None
See application file for complete search history.

(56) References Cited

U.S. PATENT DOCUMENTS

| | | |
|---|---|---|
| 3,317,471 A | 5/1967 | Johnson et al. |
| 3,510,464 A | 5/1970 | Sato |
| 3,560,461 A | 2/1971 | Yonezu et al. |
| 3,585,177 A | 6/1971 | Gardner et al. |
| 3,595,740 A | 7/1971 | Gerow |
| 3,763,021 A | 10/1973 | Householder |

(Continued)

FOREIGN PATENT DOCUMENTS

EP    0 217 501 A2    4/1987

(Continued)

OTHER PUBLICATIONS

USPTO Non-Final Office Action dated Oct. 17, 2007 relating to the divisional case U.S. Appl. No. 10/915,860 filed Aug. 11, 2004.

(Continued)

*Primary Examiner* — Vivian Chen
(74) *Attorney, Agent, or Firm* — Timothy D. Meade

(57) ABSTRACT

A coating composition is provided for use in laminate substrates useful in packaging of liquids and solids where the coating provides and increased resistance to the permeability of gases such as oxygen and carbon dioxide. In one embodiment the coating composition is a dispersion or a solution that comprises at least one hydroxyl functional polyetheramine, phosphoric acid and a defoamer. The backbone of the polyetheramine has diglycidyl ether linkages that comprise about 5 to about 70 mole percent resorcinol diglycidyl ether. The coating composition can be applied to substrates by coating applications such as spraying, rolling reverse and direct, rolling direct and reverse gravure, kiss coat, flow coating, brushing, dipping and curtain-wall coating, for example.

25 Claims, 1 Drawing Sheet

U.S. PATENT DOCUMENTS

| Patent No. | | | Date | Inventor | Ref |
|---|---|---|---|---|---|
| 3,833,142 | A | * | 9/1974 | Owen et al. | 215/351 |
| 3,847,845 | A | | 11/1974 | Tada et al. | |
| 3,960,983 | A | | 6/1976 | Blank | |
| 4,056,510 | A | | 11/1977 | Symm et al. | |
| 4,058,647 | A | | 11/1977 | Inoue et al. | |
| 4,104,222 | A | * | 8/1978 | Date et al. | 524/247 |
| 4,117,065 | A | * | 9/1978 | Tsien et al. | 264/105 |
| 4,123,415 | A | * | 10/1978 | Wambach | 524/451 |
| 4,141,871 | A | | 2/1979 | Shimp et al. | |
| 4,159,233 | A | * | 6/1979 | Ting et al. | 204/500 |
| 4,254,169 | A | | 3/1981 | Schroeder | |
| 4,284,540 | A | * | 8/1981 | Iida et al. | 524/400 |
| 4,284,674 | A | | 8/1981 | Sheptak | |
| 4,393,106 | A | * | 7/1983 | Maruhashi et al. | 428/36.7 |
| 4,427,805 | A | | 1/1984 | Kooijmans et al. | |
| 4,579,889 | A | * | 4/1986 | Kaffen et al. | 523/414 |
| 4,588,099 | A | * | 5/1986 | Diez | 215/232 |
| 4,608,416 | A | * | 8/1986 | Schupp et al. | 525/130 |
| 4,618,386 | A | * | 10/1986 | Yatsu et al. | 156/242 |
| 4,639,489 | A | | 1/1987 | Aizawa et al. | |
| 4,647,648 | A | | 3/1987 | Silvis et al. | |
| 4,683,016 | A | * | 7/1987 | Dutt et al. | 156/69 |
| 4,874,647 | A | * | 10/1989 | Yatsu et al. | 428/35.7 |
| 4,917,949 | A | * | 4/1990 | Yousif | 428/349 |
| 4,959,421 | A | * | 9/1990 | Hirahara et al. | 525/437 |
| 4,977,191 | A | * | 12/1990 | Salsman | 521/48 |
| 5,032,656 | A | | 7/1991 | Mares et al. | |
| 5,055,355 | A | | 10/1991 | DeAntonis et al. | |
| 5,068,063 | A | * | 11/1991 | Tremper, III | 252/519.34 |
| 5,221,700 | A | * | 6/1993 | Gilbert et al. | 523/404 |
| 5,275,853 | A | * | 1/1994 | Silvis et al. | 428/35.4 |
| 5,281,630 | A | * | 1/1994 | Salsman | 521/48.5 |
| 5,380,464 | A | * | 1/1995 | McGee et al. | 516/118 |
| 5,489,455 | A | | 2/1996 | Nugent, Jr. et al. | |
| 5,573,819 | A | | 11/1996 | Nugent, Jr. et al. | |
| 5,686,551 | A | * | 11/1997 | White et al. | 528/101 |
| 5,710,209 | A | | 1/1998 | Blum et al. | |
| 5,726,277 | A | * | 3/1998 | Salsman | 528/272 |
| 5,804,099 | A | | 9/1998 | Heilen et al. | |
| 5,834,078 | A | * | 11/1998 | Cavitt et al. | 428/35.7 |
| 5,962,093 | A | * | 10/1999 | White et al. | 428/35.2 |
| 5,977,286 | A | * | 11/1999 | Marten et al. | 528/120 |
| 6,011,111 | A | | 1/2000 | Brennan et al. | |
| 6,051,295 | A | * | 4/2000 | Schloss et al. | 428/35.7 |
| 6,156,806 | A | | 12/2000 | Piechocki et al. | |
| 6,180,715 | B1 | * | 1/2001 | Schmidt | 524/611 |
| 6,277,478 | B1 | * | 8/2001 | Kurita et al. | 428/200 |
| 6,329,473 | B1 | | 12/2001 | Marten et al. | |
| 6,346,596 | B1 | | 2/2002 | Mallen et al. | |
| 6,349,640 | B1 | * | 2/2002 | Takebe et al. | 101/127 |
| 6,352,426 | B1 | | 3/2002 | Hutchinson et al. | |
| 6,365,699 | B1 | | 4/2002 | Mauer et al. | |
| 6,391,408 | B1 | * | 5/2002 | Hutchinson | 428/35.7 |
| 6,512,015 | B1 | | 1/2003 | Elms et al. | |
| 6,525,103 | B2 | | 2/2003 | Ebbrecht et al. | |
| 6,528,546 | B2 | | 3/2003 | Lee et al. | |
| 6,617,019 | B2 | | 9/2003 | Danner et al. | |
| 6,676,883 | B2 | * | 1/2004 | Hutchinson et al. | 264/510 |
| 6,756,444 | B2 | | 6/2004 | Akkapeddi et al. | |
| 6,764,752 | B2 | | 7/2004 | Chang et al. | |
| 6,770,238 | B2 | | 8/2004 | Choinski | |
| 6,777,088 | B2 | * | 8/2004 | Walker et al. | 428/412 |
| 6,790,524 | B2 | | 9/2004 | Chang et al. | |
| 6,811,530 | B2 | | 11/2004 | Watanabe et al. | |
| 6,828,010 | B2 | | 12/2004 | Kubota et al. | |
| 6,835,461 | B1 | | 12/2004 | Yamagata et al. | |
| 6,891,981 | B2 | | 5/2005 | Price et al. | |
| 6,939,591 | B2 | | 9/2005 | Hutchinson et al. | |
| 6,974,045 | B1 | * | 12/2005 | Trombach et al. | 215/232 |
| 6,982,119 | B2 | * | 1/2006 | Shi et al. | 428/413 |
| 7,150,902 | B2 | * | 12/2006 | Farha | 428/36.6 |
| 7,163,727 | B2 | * | 1/2007 | Su et al. | 428/35.7 |
| 7,303,387 | B2 | * | 12/2007 | Hutchinson et al. | 425/547 |
| 7,303,797 | B1 | * | 12/2007 | Barsotti et al. | 428/36.7 |
| 2001/0056137 | A1 | * | 12/2001 | Buter et al. | 523/414 |
| 2003/0031814 | A1 | * | 2/2003 | Hutchinson et al. | 428/35.7 |
| 2003/0069340 | A1 | | 4/2003 | Beckerdite et al. | 524/284 |
| 2003/0219555 | A1 | * | 11/2003 | Hutchinson et al. | 428/35.7 |
| 2003/0220036 | A1 | | 11/2003 | Lee et al. | |
| 2004/0071885 | A1 | * | 4/2004 | Hutchinson et al. | 427/385.5 |
| 2004/0131871 | A1 | | 7/2004 | Lee et al. | |
| 2005/0069719 | A1 | | 3/2005 | Blemberg et al. | |
| 2005/0070660 | A1 | * | 3/2005 | Bode et al. | 524/542 |
| 2005/0079306 | A1 | | 4/2005 | Koyama et al. | |
| 2005/0079322 | A1 | | 4/2005 | Knoerzer et al. | |
| 2005/0079380 | A1 | | 4/2005 | Iwanaga | |
| 2007/0031673 | A1 | | 2/2007 | Bode et al. | |
| 2008/0014429 | A1 | | 1/2008 | Su et al. | |

FOREIGN PATENT DOCUMENTS

| | | | |
|---|---|---|---|
| GB | 2 131 723 A | * | 6/1984 |
| WO | WO 99/20673 | * | 4/1999 |
| WO | WO 01/18096 | * | 3/2001 |
| WO | WO 03/020788 | * | 3/2003 |

OTHER PUBLICATIONS

Written Opinion for International Application No. PCT/US2004/025909 dated Dec. 23, 2004.

International Search Report for International Application No. PCT/US2004/025909 dated Dec. 28, 2004.

International Preliminary Report on Patentability for International Application No. PCT/US2004/025909 dated Sep. 6, 2005.

Dow Plastics, BLOX 0000 and 4000 Series Product Information Sheet, Dec. 1999, Midland, Michigan.

USPTO Non-Final Office Action dated Feb. 28, 2007 relating to the divisional case U.S. Appl. No. 10/915,860 filed Aug. 11, 2004.

The Health Effects Institute, Program Summary, "Research on Air Topics," May 1999, 12 pages.

USPTO Notice of Abandonment, dated Mar. 18, 2010, relating to case U.S. Appl. No. 10/915,860 filed Aug. 11, 2004.

USPTO Final Office Action dated Sep. 3, 2009 relating to parent application U.S. Appl. No. 10/915,860 filed Aug. 11, 2004.

* cited by examiner

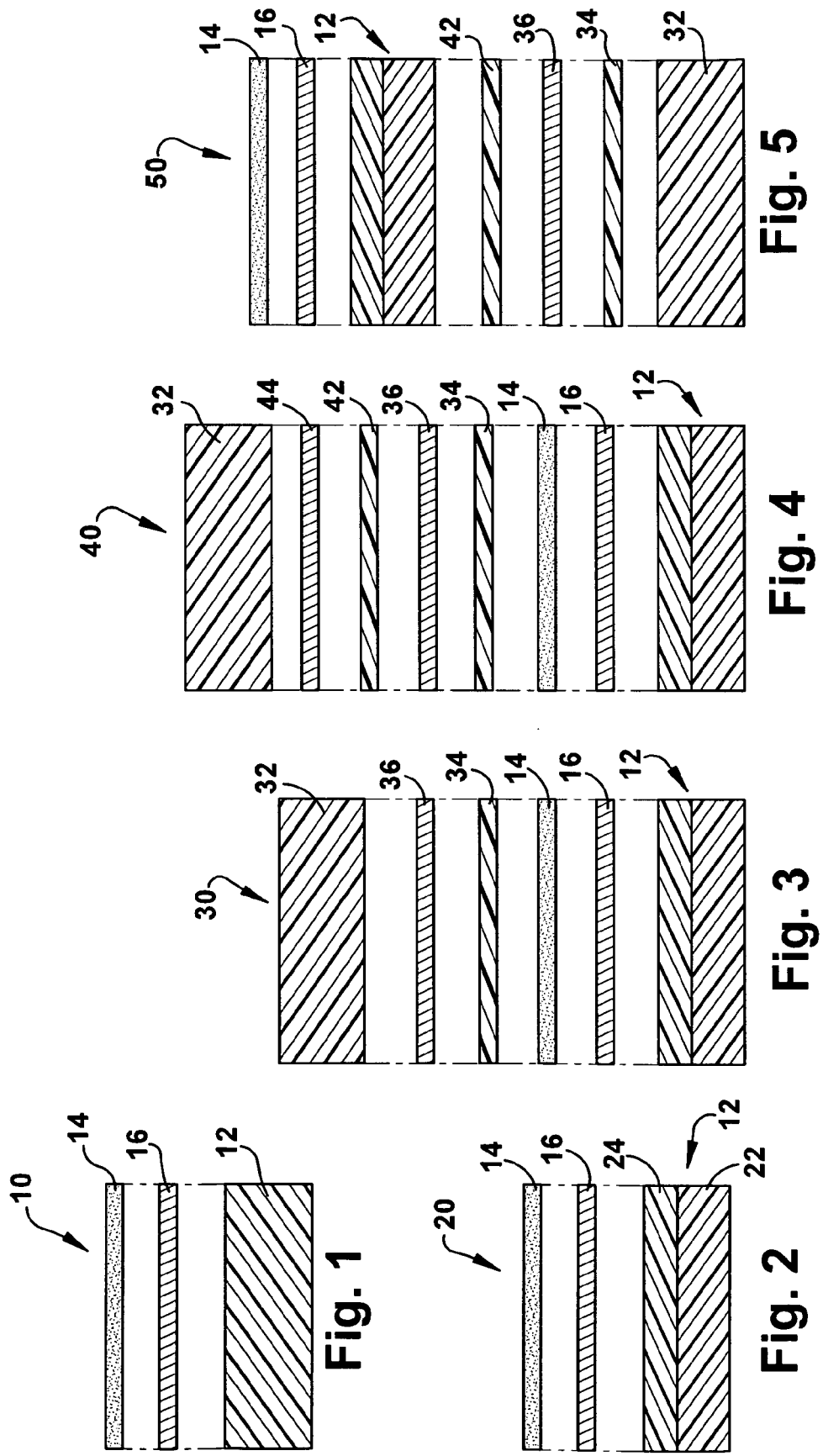

CURABLE POLYMERIC WATER BASED COATING COMPOSITIONS AND RESULTING COATINGS WITH BARRIER PROPERTIES FOR GASES AND LAMINATE STRUCTURES

RELATED APPLICATIONS

This application claims benefit and priority under 35 U.S.C. 120 from utility application entitled "Curable Polymeric Water Based Coating Compositions and Resulting Coatings with Barrier Properties for Gases and Coated Substrates and Containers", having Ser. No. 10/915,860 filed on Aug. 11, 2004, which claims benefit and priority under 35 U.S.C. 119(e) from provisional application Ser. No. 60/494,271 filed Aug. 11, 2003, the entire contents of each of the aforementioned patent applications are incorporated herein by reference.

The present disclosure relates to polymer coating compositions which also have water in the nature of water based, waterborne, latex, emulsion or dispersion compositions. This disclosure also relates to laminate structures that include a polymer layer and a coating layer having barrier properties.

Technical Considerations

Various materials such as polymers or paper-based substrates find increasing utilization as containers for a multitude of products such as, for example, beverages, foods, and medical diagnostic substances. A few of the advantages of the polymeric laminate structures offered in packaging applications include light weight and easy disposability or recyclability. Many polymeric materials gaining popularity for use in packaging generally lack adequate resistance to the permeability of various gases across or through the laminate structures. For example, carbon dioxide can escape over time from carbonated beverages, for example, and oxygen can enter the container and adversely affect products, such as the taste of the food or beverage, over time. Thus, carbon dioxide and oxygen permeability and thicknesses required of these materials can offset the natural advantages of weight reduction and lower cost provided by these materials in determining the packaging material of choice.

Various coating compositions have been developed for use in laminate structures to improve the resistance or retard permeability of various gases such as carbon dioxide and oxygen. However, conventional curable thermosetting coatings that are applied and cured on the final container do not provide efficiency that can be achieved where coatings are applied before the packaging materials undergo a sizing step. For example, conventional thermosetting coatings are often unusable where the packaging materials undergo considerable stretching in an orientation process, such as monoaxial or biaxial alignment, because these coatings will crack or fracture under the stretching forces.

Thus, there is a need for a polymer coating composition that has improved permeation resistance to gases while also having improved flexibility. There is also a need for laminate structures that have improved permeation resistance to gases after having been oriented during one or more sizing steps during the formation of packaging. Although the invention described herein may obviate one or more of the afore-mentioned needs, it should be understood that some aspects of the invention might not necessarily obviate one or more of those needs.

SUMMARY

In one aspect, as embodied and broadly described herein, the present disclosure may include polymer coating compositions with at least one poly(hydroxyl amino ether), also known as polyetheramine, and water in the nature of water based, waterborne, latex, emulsion or dispersion compositions that, when dried, yield coatings having reduced permeability to various gases, for example, carbon dioxide and oxygen. The coating composition can be dried to form a coating film of a laminate structure that includes, for example, at least one polymer layer, and as another example, additional layers of polymer layers, decorative layers, such as for example metal layers and ink layers, and bonding layers. The laminate structure can be used in a variety of applications, for example, such as food packaging, in which the coating film can provide reduced permeability to gases.

In another aspect of the present disclosure, the coating composition includes at least one of a dispersion or solution containing from about 10 percent to about 90 percent solids and from about 90 percent to about 10 percent carrier, based on the weight of the coating composition. The solids components include, from about 70 percent to less than about 100 percent poly(hydroxyl amino ethers, or polyetheramine; from about 1 percent to about 30 percent phosphoric acid; and up to about 5 percent defoamer, each of which is based on weight of the solids in the coating composition. The polyetheramine can be prepared by contacting one or more of the diglycidyl ethers with a dihydric phenol and a difunctional amine under conditions sufficient to cause the amine moieties to react with epoxy moieties to form a polymer backbone having amine linkages, ether linkages and pendant hydroxyl moieties solubilized with phosphoric acid. The polyetheramine can have an amount of resorcinol diglycidyl ether that ranges from about 5 mole percent to about 70 mole percent of the diglycidyl ethers.

In another aspect of the present disclosure, the coating composition can optionally include up to about 10 percent of at least one water dispersible or solubilizable aminoplast reactive with the polyetheramine, based on the weight of solids in the coating composition. The aminoplast can function as a carrier for a defoamer in the dispersion or solution, or function as a crosslinker, or both, as will be further described.

In alternative aspects, the coating composition can further include additional optional ingredients depending upon the desired results or performance. For example, the coating composition can further include from about 0.05 percent to about 5 percent of alcohol that is substantially pure, based on the weight of solids in the coating composition. In another example embodiment the coating composition can include up to about 10 percent of a protic or aprotic acid, for example, lactic acid, that is substantially pure, based on the weight of solids in the coating composition.

The coating composition, upon removal of any solvents or carriers present in the polymer emulsion, dispersion, suspension or solution, can coalesce to produce a coating film with improved properties of resistance to gas permeation, for example oxygen and/or carbon dioxide. Therefore, the present invention also provides for a laminate structure that includes a polymer layer and a coating layer disposed on the polymer layer, where the coating layer is a residue of any of the coating compositions described above.

In the above summary, certain aspects and embodiments are evident; however, it should be understood that the invention, in its broadest sense, could be practiced without having one or more features of these aspects and embodiments. It should be understood that these aspects and embodiments are merely exemplary.

BRIEF DESCRIPTION OF THE DRAWINGS

The accompanying drawings, which are incorporated in and constitute a part of this specification, illustrate a number of non-limiting embodiments of the invention and together with the description, serve to explain the principles of the invention. The components in the drawings are not necessarily to scale. Also, in the drawings, like reference numerals designate corresponding parts throughout the several views.

FIG. 1 is an exploded cross-sectional schematic of a laminate structure which includes a coating layer applied to a first polymer layer, according to an embodiment of the invention;

FIG. 2 illustrates the laminate structure of FIG. 1 showing the first polymer layer that includes at least two films of different polymer compositions, according to an embodiment of the present invention;

FIG. 3 is an exploded cross-sectional schematic of a laminate structure in which a coating layer is disposed between the first polymer layer and a second polymer layer, according to an embodiment of the present invention;

FIG. 4 is an exploded cross-sectional schematic of a laminate structure in which a coating layer and a decorative layer are disposed between a first polymer and a second polymer layer, according to an embodiment of the present invention; and FIG. 5 is an exploded cross-sectional schematic having a first polymer layer disposed between a coating film and a second polymer layer, and at least one decorative layer is disposed between the first polymer layer and the second polymer layer, according to an embodiment of the invention.

DETAILED DESCRIPTION

In the description other than in the operating examples, or where otherwise indicated, all numbers expressing quantities of ingredients, reaction conditions, dimensions, physical characteristics, processing parameters and so forth used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10.

As used herein, "formed from" denotes open, e.g., "comprising," claim language. As such, it is intended that a composition "formed from" a list of recited components be a composition comprising at least these recited components, and can further comprise other non-recited components during the composition's formation. Also, as used herein, the term "reactive" refers to a functional group that forms a covalent bond with another functional group under conditions sufficient to cure the composition.

The term "hydroxyl functionality" is employed to designate the presence of the hydroxyl chemical group (—OH). Also, as used herein, the term "polymer" is meant to include oligomers, homopolymers and copolymers.

Spatial or directional terms used herein in regards to the position of the coating film on a material or substrate of a laminate structure, such as "left", "right", "inner", "outer", "above", "below", "top", "bottom" "over", "on", and the like have their standard dictionary meanings. However, it is to be understood that the invention may assume various alternative orientations and, accordingly, such terms are not to be considered as limiting. Further, as used herein, the terms "deposited over", "applied over", "provided over", or "disposed on", mean deposited or provided on, but not necessarily in surface contact with. For example, a coating "deposited over" a substrate does not preclude the presence of one or more other coating films or layers of the laminate structure of the same or different composition located between the deposited coating and the substrate. Furthermore, as another example, the term a coating film "disposed between" a first layer and a second layer of a laminate structure does not preclude the presence of one or more other coating films or layers of different compositions between the coating film and the first layer or between the coating film and the second layer.

The crosslinkable film-forming coating composition of the present invention can be comprised of at least water-containing, borne, or based coating composition with at least one water dispersion or solution of at least one poly(hydroxyl amino ethers, also known as polyetheramine (hereinafter "polyetheramine"). The coating compositions herein have improved flexibility when applied to a polymer layer, or substrate, to produce a laminate structure exhibiting superior gas barrier properties. Because of the amorphous nature of polyetheramine, monoaxial as well as biaxial orientation of the coating composition disposed on a polymer layer, for example, a poly(alkylene) such as polyolefin or a polyester substrates, can be achieved with no attendant cracking or peeling of the polyetheramine under stretching forces and elevated drying temperatures. Thus, laminate structures which may include monoaxially or biaxially oriented layers, can be used in containers, for example a frozen food tray, and provide increased resistance to permeation to gases such as oxygen and carbon dioxide.

The dispersion or solution includes a carrier that allows for easy application of the coating formulation onto substrates, but the carrier can be removed as needed under processing conditions, for example during the drying step during the manufacture of laminate structures. In one non-limiting embodiment, the coating composition includes at least one of a dispersion or solution containing from 10 percent to 90 percent solids and from about 90 percent to 10 percent carrier; in another embodiment from 10 to 50 percent solids and from 50 to 90 percent carrier; and alternatively from 25 percent to 35 percent solids and from 65 percent to about 75 percent carrier, based on the weight of the coating composition. The carrier is a liquid medium and can include, for example, water, or a mixture of water and organic solvents. The solvents can be water miscible and can be used as one or more co-solvents as is known to those skilled in the art of water borne compositions. The carrier can be added as a separate component to the coating composition, but can also be added, for example, incrementally or in apportionments with one or more of the solid components of the coating composition. For instance the polyetheramine with the acid in the water borne medium can be diluted or the existing water and any co-solvents with the polyetheramine can also be part of the carrier for the coating composition.

In one embodiment of the present disclosure the solids of the coating composition can include, based on weight of the solids in the coating composition:

from 70 percent to less than 100 percent, and another embodiment from 75 percent to 95 percent and yet another embodiment from 85 percent to 92 percent less than 100 percent poly(hydroxyl amino ethers, also known as polyetheramine (hereinafter "polyetheramine");

from about 1 percent to about 30 percent, and another embodiment from 5 percent to 25 percent, and yet another embodiment from 8 percent to 15 percent phosphoric acid; and from up to 5 percent, in another embodiment from 0.05 percent to 2 percent, in yet another embodiment from 0.1 percent to 1 percent defoamer.

The polyetheramine is prepared by contacting one or more of the diglycidyl ethers with a dihydric phenol and a difunctional amine under conditions sufficient to cause the amine moieties to react with epoxy moieties to form a polymer backbone having amine linkages, ether linkages and pendant hydroxyl moieties solubilized with phosphoric acid. The polyetheramine can have an amount of resorcinol diglycidyl ether in mole percentage that ranges from 5 to 70, in another embodiment, from 10 to 50, and in yet another embodiment, from 25 to 35 of the diglycidyl ether In another embodiment, the polyetheramide can have an amount of resorcinol diglycidyl ether that ranges from 5 mole percent to 70 mole percent of the diglycidyl ether and the coating composition further includes at least one water dispersible or solubilizable aminoplast reactive with the polyetheramine. The amount of aminoplast can range from up to 10 percent, in another embodiment, from 0.5 percent to 5 percent, and in yet another embodiment from 1 percent to 3 percent, based on the weight of the solids in the coating composition.

In any of the embodiments described above, the coating composition can further include at least one alcohol in an amount that ranges from 0.05 percent to 5 percent, in another embodiment, from about 0.5 percent to about 4 percent, in yet another embodiment, from about 1 percent to about 3 percent alcohol that is substantially pure, based on the weight of the solids of the coating composition. Non-limiting examples of alcohols include any of those disclosed elsewhere in the present application such as those with one to 6 carbon atoms and particularly those that are monohydric.

In another embodiment, the coating composition can further include at least one protic or aprotic acids in addition to the phosphoric acid. Additional protic or aprotic acids can include, for example, lactic acid, acetic acid, maleic acid, malic acid. These acids when substantially pure can collectively be present in amounts of up to 15 percent; in another embodiment, from 1 percent to 7 percent; and in yet another embodiment, from 1 percent to about 3 percent, based on the weight of the solids in the coating composition. Additional optional ingredients, as will be described below, may be present at up to about 40% by weight based on the total weight of resin solids of the coating composition.

The polyetheramine can be prepared by contacting one or more of the diglycidyl ethers of a dihydric phenol with a difunctional amine under conditions sufficient to cause the amine moieties to react with epoxy moieties to form a polymer backbone having amine linkages, ether linkages and pendant hydroxyl moieties solubilized with phosphoric acid. The polyetheramine, which can also be called polyhydroxy amino ether (PHAE), is an epoxy-based thermoplastic. Its repeating unit is composed of aromatic ether and ring or linear amine in the backbone chain, and hydroxyl groups in the pendants from the opening of the epoxy groups. The basic PHAE is made of bis-phenol A diglycidyl ether (BADGE) and ethanol amine. Modification of the PHAE properties can be achieved by co-polymerization of BADGE and resorcinol diglycidyl ether (RDGE) with ethanol amine. Gas barrier properties can be improved by varying the amounts of resorcinol diglycidyl ether of the diglycidyl ethers.

Non-exclusive examples of poly(hydroxy amino ethers) or polyetheramines and their dispersions or solutions or emulsions are shown in U.S. Pat. Nos. 6,180,715; 6,156,806; 5,834,078; 5,686,551; 5,275,853; and 5,962,093 each incorporated herein by reference for their entire teachings. These hydroxy-functional polyetheramines can be thermoplastic, and generally are useful as the aqueous dispersion or solution of an acid salt of the polyetheramine. The polyetheramine can have repeating units represented by the formula:

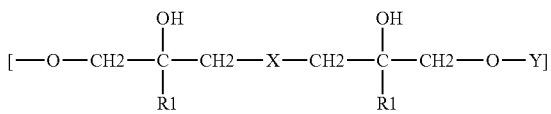

wherein R1 in each occurrence is independently hydrogen or C1-C12 alkyl; Y is a hydrocarbylene moiety and X is:

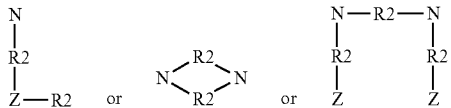

where R2 is independently in each occurrence $C_2$-$C_{20}$ hydrocarbylene and Z is independently in each occurrence H, alkylamido, hydroxyl, alkoxy, alkylcarbonyl, aryloxy, arycarbonyl halo, or cyano. The hydroxy-functional polyetheramine can be prepared by contacting a diglycidyl ether of a dihydric phenol with an amine having only two hydrogens under conditions sufficient to form the polyetheramine. The presence of a secondary or tertiary amine end group, as opposed to a glycidyl end group, assists in providing a true thermoplastic polymer that is even melt-stable under usual melt processing conditions. For purposes of this invention, "hydrocarbyl" is a monovalent hydrocarbon such as alkyl, cycloalkyl, aralkyl, or aryl and "hydrocarbylene" is a divalent hydrocarbon such as alkylene, cycloalkylene, aralkylene or arylene.

Conditions conventionally employed in the reaction of diglycidyl ethers with amines to form amine linkages and pendant hydroxyl groups are suitably employed in preparing these resins. Examples of such suitable conditions are set forth in U.S. Pat. No. 3,317,471, which is hereby incorporated by reference in its entirety. In general, however, the process for preparing the polymers including the copolymers is carried out so that the unreacted epoxy groups in the finished polyether are minimized. By minimizing the epoxy groups in the polyetheramine, the essential thermoplastic character of the polyetheramine can be retained. In the preparation of copolymers, a dihydric phenol is employed in addition to the amine. In such copolymerizations, while it is possible to subject a mixture of the diglycidyl ether(s), amine(s) and dihydric phenol(s) to copolymerization conditions, it is sometimes desirable to employ a staged addition procedure wherein the dihydric phenol is added before the amine is introduced or after essentially all of the amine has reacted with the diglycidyl ether. In the preparation of the copolymers wherein the reaction of dihydric phenol with diglycidyl ether is desired, conditions are employed to promote such reactions such as described in U.S. Pat. No. 4,647,648, which is hereby incorporated by reference in its entirety.

Suitable types of hydroxy-functional polyetheramines are those known in the marketplace as produced by Dow Chemical Company under the trademark Blox® materials. These polyetheramines can be prepared into a dispersion or emulsion in a manner similar to that described in U.S. Pat. No. 6,180,715, which is hereby incorporated by reference in its entirety.

The phosphoric acid which reacts with the polyetheramine to produce phosphated polyetheramine in a coating composition that, once dried, yields a coating film having excellent resistance to gas permeation, for example, oxygen and carbon dioxide. The phosphoric acid present in the coating compositions can be added to the polyetheramine in a solution, for example, an aqueous solution having less than about 85 percent solids. Additional protic or aprotic acids besides phosphoric acid, and which include, but are not limited to, lactic acid, maleic acid, malic acid, can be added to the coating composition to affect the particle size of the dispersion. The average particle size of the phosphated polyetheramine of the coating composition can be less than 500 nanometers, in an alternative embodiment, the average particle size can range from 50 nanometers to 400 nanometers, and in yet an alternative embodiment, the average particle size can range from 80 nanometers to 200 nanometers. In some applications, a coating composition that dries to a clear coating film is desirable and the addition of the protic or aprotic acids can aid in achieving the appropriate particle size for the application. As mentioned above, the protic and aprotic acids can be added to the polyetheramine in a solution, for example, an aqueous solution having less than 85 percent solids.

One of several defoamers, or mixtures of defoamers may be used. For example, a defoamer that is compatible with a phosphated polymer can be used. In some cases relatively higher levels of defoamer are needed to achieve defoaming action but a higher amount needs to be balanced with the type of solvent used in the coating composition to avoid adverse affects. Examples of a defoamer or anti-foaming agent can include, but are not limited to, defoamers that comprise: silicone; alcohols; glycol ethers; mineral spirits; acetylene diol; polysiloxane, for example, siloxane glycol, organosiloxane; and any combinations of two or more of these.

Defoamers that are essentially solvent free, that is, defoamers substantially free of organic compounds, can be used, although defoamers or anti-foaming agents need not be solvent free to be suitable. Additionally, non-aqueous defoamers, that is, defoamers that contain substantially no water can be used. It has been found that the use of a non-aqueous defoamer can help avoid foam build allows the coating composition to allow for good coverage upon a sheet substrate. In coating operations in which the substrate undergoes stretching, for example monoaxial or biaxial stretching or is otherwise stretched to a two-dimensional area that is several times its original size, the coating composition can be applied in a thick layer followed by stretching that causes the substrate to stretch, for example, up to about eight times its original size before stretching. The layer of the coating composition has enough flexibility to maintain its continuous web or coverage upon drying into a coating film that provides gas barrier properties. *

An example of a suitable defoamer is one having a combination of siloxane glycol, organosiloxane, and the reaction product of silicon dioxide and organosiloxane polymer. Another example of a suitable defoamer is one having 55 percent polyglycol, 30 to 40 percent organosiloxane and the remainder siloxane glycol, based on the weight of the solids of the defoamer. A suitable non-aqueous defoamer is BYK 080 A defoamer from BYK-Chemie USA Inc. of Wallingford, Conn. *

Where the coating composition has a low VOC, for example a coating composition that includes a Blox® polyetheramine, an effective defoamer is one that will not adversely affect coating flow-out, sheeting and coverage capability. As with the aforementioned defoamers additional defoamers that are effective in eliminating foams in such situations include: products such as Antibubble DF-123, DF-125 and DF-162 from Lubrizol; Dee-Fo PI-4, PI-215, and PI-40 from Ultra Additive; Patcote 858, 525, and 519 from Patco; Additives 65 and 62 from Dow Corning; BYK-028A, BYK-022, BYK-019 from BYK-Chemie; and Foamstar A-032 and A-038 from Cognis. Several solvents also can be used as defoamers such as ethanol, iso-propanol, methyl isobutyl ketone (MIBK), acetone, tert-butyl acetate and mineral alcohols.

Defoamers that are suitable are those available from DOW CORNING Dow Corning Corporate Center, Midland, Mich., U.S.A. which include: Antifoam FG-10 Emulsion; Antifoam H-10 Emulsion; Antifoam Y-30 Emulsion; 200® Fluid; 544 Antifoam Compound; FS-1265 Fluid; Antifoam 1400 Compound Antifoam 1410 Emulsion; Antifoam 1430 Emulsion; Antifoam 1510-US Emulsion Antifoam 1520-US Emulsion; Antifoam 2200; Antifoam 2210; 7305 Antifoam; Q2-2617 Diesel Antifoam; Q2-2647 Diesel Antifoam; Q2-2677 Diesel Antifoam; Q2-2600 Diesel Antifoam; Antifoam A Compound; Antifoam AF Emulsion; Antifoam B Emulsion; Antifoam C Emulsion; 2-3436 ANTIFOAM COMPOUND; 2-3522 ANTIFOAM COMPOUND; 2-3896 ANTIFOAM COMPOUND; 2-3898 ANTIFOAM COMPOUND; 2-3899 ANTIFOAM COMPOUND; 2-3900 ANTIFOAM COMPOUND; 2-3902 ANTIFOAM COMPOUND; 2-3911 ANTIFOAM; 2-3912 ANTIFOAM; 3160 ANTIFOAM COMPOUND; ANTIFOAM 1400; ANTIFOAM 1500; ANTIFOAM A COMPOUND; ANTIFOAM A COMPOUND—FOOD GRADE; Q2-4128 ANTIFOAM.

Defoamers that are suitable that are available from LUBRIZOL Corporation Wickliffe, Ohio include: Foam Blast® RKA and Foam Blast® RKB defoamers. Defoamers that are suitable that are available from BYK-Chemie USA Inc. of 524 South Cherry Street, P.O. Box 5670, Wallingford, Conn. 06492-7651 Website: http://www.bvk-chemie.com include: BYK®-052; BYK®-057; BYK®-066 N; BYK®-088; BYK®-354; BYK®-392; BYK®-031; BYK®-032; BYK®-033; BYK®-034; BYK®-035; BYK®-036; BYK®-037; BYK®-038; BYK®-017; BYK®-018; BYK®-019; BYK®-020; BYK®-021; BYK®-022; BYK®-023; BYK®-024; BYK®-025; BYK®-028 A; BYK®-044; BYK®-045; BYK®-060 N; BYK®-065; BYK®-066 N; BYK®-067 A; BYK®-070; BYK®-071; BYK®-080 A; BYK®-088; BYK®-094; BYK®-141; BYK®-1610; BYK®-1615; BYK®-1650; BYK®-1660; Byketol®-WS; BYK®-011; BYK®-012; BYK®-051; BYK®-052; BYK®-053; BYK®-055; BYK®-057; BYK®-A 500; BYK®-A 501; and BYK®-A 530 defoamers.

Defoamers that are suitable that are available from Tego Chemie Service GmbH a business unit of the Degussa AG, Tego Chemie Service GmbH, Goldschmidtstr. 100, 45127 Essen, Germany; Degussa Tego Coating and Ink Additives, 1111 South 6th Avenue, P.O. Box 1111, Hopewell, Va. 23838, USA include: TEGO® Foamex 3062, TEGO® Foamex 8050, TEGO® Foamex K 3, TEGO® Foamex 1488, TEGO® Foamex 7447, TEGO® Foamex 800, TEGO® Foamex 805, TEGO® Foamex 808, TEGO® Foamex 815, TEGO® Foamex 822, TEGO® Foamex 825, TEGO® Foamex 845, TEGO® Foamex 1495, TEGO® Foamex 8030, TEGO®

Foamex 810, TEGO® Foamex 830, TEGO® Foamex 832, TEGO® Foamex 835, TEGO® Foamex 840, and TEGO® Foamex 842 defoamers.

The coating compositions of the present invention can optionally include at least one water dispersible or solubilizable aminoplast reactive with the polyetheramine. The aminoplast can also function to carry the defoamer into a dispersion or solution containing polyetheramine, or can function as a crosslinking agent, or both. For example, it is possible to pre-blend the defoamer in a crosslinker to aid the incorporation process and reduce variability in the addition levels. A suitable pre-blend ratio is, for example, a ratio of defoamer to aminoplast that ranges from 1:1 to 1:20, in another example, a ratio that ranges from 1:5 to 1:15, and as another example, a ratio that ranges from 1:8 to 1:12.

Aminoplast materials include, for example, aminoplasts that comprise methylol ether groups. Aminoplasts can be obtained from the reaction of an aldehyde like formaldehyde with an amine or amide or with amino- or amino-group-carrying substances, and the reaction products can be condensates, oligomers, or resins. The most common amines or amides are melamine, urea, dicyandiamide, or benzoguanamine, and these are preferred; however other amines including, but not limited to, triazines, triazoles, diazines, guanidines, or guanamines can be used. Condensates with other amines or amides include; for example, aldehyde condensates of glycoluril, which give a high melting crystalline product. While the aldehyde used is most often formaldehyde, other aldehydes such as acetaldehyde, crotonaldehyde, and benzaldehyde may be used.

Generally the aminoplast can contain imino and/or methylol groups; for instance, at least a portion of the methylol groups can be etherified with an alcohol to modify the cure response. Any monohydric alcohol may be employed for this purpose including methanol, ethanol, n-butyl alcohol, isobutanol, and hexanol, with methanol, n-butyl alcohol and isobutanol being preferred. Non-exclusive examples of suitable aminoplasts include: melamine-, urea-, or benzoguanamine-formaldehyde condensates, such as the monomeric materials that are at least partially etherified with one or more alcohols containing from one to four carbon atoms. Also the methylol groups can be fully etherified with at least one alcohol selected from the group consisting of methanol, n-butanol, and isobutanol. Partially etherified aminoplasts are more suitable in yielding the more flexible type of coating film for thermoplastic coatings.

Non-limiting examples of suitable aminoplast resins include monomeric or polymeric melamine formaldehyde resins, including melamine resins that are partially or fully alkylated using alcohols that have one to six carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. A suitable aminoplast is available from Solutia Inc. under the trademark RESIMENE 751, as a highly monomeric fully alkylated melamine etherified with both methanol and n-butanol. Alternatively, the aminoplast is preferably at least partially etherified with isobutanol. Another suitable aminoplast is available from CYTEC Industries as CYMEL 1161 material. The aminoplast can be a melamine formaldehyde condensate. Suitable melamine resins include commercial grade hexamethoxymethylmelamines such as, for example, CYMEL 385 and CYMEL 303 crosslinking agents, available from Cytec. The CYMEL 303 is suitable where higher temperature curing reactions are needed and available.

Aminoplasts with high imino and high methylol content can be effective for lower temperature crosslinking reactions or curing. Also water solubility allows for easier incorporation of the aminoplast into water borne coating compositions. Higher degrees of etherification are more suitable for higher temperature crosslinking reactions or curing applications. Faster curing reactions work best in producing thermoplastic coating films. Generally aminoplasts with the below-presented chemical functionality have a decreasing rate of reactivity from (A) to (C). For (B) this functionality is pending from the aminoplast, while for (C) 6 of these groups are available in the Cymel 303 material.

(A)

(B)

(C)

As described above, the waterborne coating composition can have a water-soluble cross-linker. For example, the water-soluble cross-linker can be an aminoplast resin that is reactive with the hydroxyl groups of the aqueous polyetheramine dispersion. A suitable water-soluble cross-linker is commercially available from Cytec Industries Inc. as Cymel® 327 material. Another suitable water-soluble aminoplast cross-linker has a non-volatile weight percent in the range of 85 to 95 percent and a viscosity of 1,000 to 7,500 centipoise. The water-soluble cross-linker having these characteristics improves the sprayability of the waterborne coating composition. If the waterborne coating composition has too high of a viscosity, the waterborne coating composition will not be able to be applied as a sray using standard spray application equipment.

In an alternative embodiment, precursors of aminoplasts can be employed. For example, precursors such as hexamethylol melamine, dimethylol urea, and their etherified forms, i.e., modified with alkanols having from one to four carbon atoms, can be used. Hexamethoxymethyl melamine and tetramethoxy glycoluril exemplify said etherified forms. Amino cross-linking agents sold by Cytec Industries Inc. under the trademark CYMEL, for example, CYMEL 301, CYMEL 303, and CYMEL 385 alkylated melamine-formaldehyde resins are useful. Of course, it is possible to use mixtures of any or all of the above N-methylol products.

Aminoplast material, crosslinking, or curing agents are generally provided for the more thermosetting applications in an amount sufficient to react with around at least one-half the hydroxyl groups of the polyetheramine, i.e., at least one-half the stoichiometric equivalent of the hydroxyl functionality. The cross-linking agent can be sufficient to substantially completely react with all of the hydroxyl functionality of the polyetheramine, and cross-linking agents having nitrogen cross-linking functionality are provided in amounts of from 2 to 12 equivalents of nitrogen cross-linking functionality per equivalent of hydroxyl functionality of the polyetheramine. This typically translates to an aminoplast being provided at between greater than 10 to 70 parts per hundred parts of resin. Lesser amounts of aminoplast are generally used to produce thermoplastic coating films.

The coating composition can optionally have additional components. For example if the aminoplast is present in the coating composition, one or more catalysts may be present to accelerate the cure of the aminoplast with reactive groups on the polymer. Examples of suitable catalysts are acidic materials and include acid phosphates and sulfonic acid or a substituted sulfonic acid such as dodecylbenzene sulfonic acid or paratoluene sulfonic acid. The catalyst when used may be present in an amount up to 5 percent by weight, more suitably an amount in the range from 0.5 to about 1.5 percent by weight, based on the weight of solids may be used.

It has been found that the addition of alcohol to the coating composition, in an amount from 0.05 percent to 5 percent based on the weight of the solids of the coating composition, as described above, can reduce the buckling of the coating where the coating composition is applied to a polymeric substrate such as a polymeric layer and dried in the formation of structured laminates. Alcohols can include, but are not limited to, isopropyl alcohol (isopropanol), glycol monobutyl ether (EGBE), and mixtures thereof.

Other additional optional ingredients can include; for example, colorant, pigments, clays, including nanoclays, dyes, wax, plasticizers, defoamers, surfactants, thixotropic agents, anti-gassing agents, organic cosolvents, flow controllers, anti-oxidants, UV light absorbers, UV stabilizers and similar additives conventional in the art may be included in the coating composition. These ingredients may be present at up to 40% by weight based on the total weight of resin solids of the coating composition.

The coating composition can be prepared by methods employed in preparing polyetheramine containing compositions generally which are generally known to those having ordinary skill in the art. Also the methods disclosed in the parent patent application to the present application can be used. In addition various example embodiments of the coating composition of the present disclosure were prepared according to the example methods presented by the Examples section below.

The coating compositions of the present invention can be applied to conventional packaging materials to produce packaging, for example, that has greater resistance to permeation of gases compared to materials in which the coating composition herein is not applied. Conventional packaging materials include, for example, cardboard, paperboard, polymers, for example polycarbonates and polyolefins, are known to be very gas permeable, and without application of a coating composition, generally have limited use as packaging for oxygen sensitive foods, beverages, or medicines. FIGS. 1-5 are exploded cross-sectional illustrations of various example embodiments of laminate structures which include a coating film formed from of any of the various inventive coating compositions described above.

Suitable oxygen transmission rates that are less than about 5 cm.$^3$-mil/100 in.$^2$-atm($O_2$)-day [cubic centimeters-mil/100 inch squared-atmoshpher (O2)-day], in alternative embodiments, less than about 2 cm.$^3$-mil/100 in.$^2$-atm($O_2$)-day would provide an effective resistance to permeability over time for many film coating applications. The moisture resistance properties of the dried coating as a film on packaging during exposure while a coated package is filled with material is measured by exposure testing over a set period of time to that filling material. For instance the coating film needs adequate resistance to alkaline material, carbonated beverages, acidic beverages, or alcoholic beverages if the coated container is filled with such materials.

FIG. 1 shows a laminate structure 10, that includes a substrate such as first polymer layer 12 and a coating layer 14 disposed on the first polymer layer 12. In another embodiment laminate structure 10 can optionally include an adhesive layer 16, commonly referred to as a "tie layer", to provide better adhesion of the coating film 14 to a first polymer layer 12. The first polymer layer comprises, but is not limited to: polyolefin, such as polyethylene and polypropylene; polycarbonate; polyester, for example poly(alkaline terephthalate); and polyamides. Polyolefins can include homopolymers, copolymers (including graft copolymers), interpolymers of alpha-olefins and the like. Examples of such homopolymers nonexclusively include ultra low density (ULDPE), low density (LDPE), linear low density (LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; polyhexene and the like. Preferred polyolefins include polyethylene, polypropylene, polybutylene and copolymers, and blends thereof. Among the most prevalent in packaging, include for example, polyolefins include polyethylene and polypropylene. As mentioned above, many of these materials can be monoaxially or biaxially oriented, for example, oriented polypropylene (OPP), biaxially-oriented polypropylene (BOPP), and oriented polyethylene terephthalate (OPET). Of course these polymers can also be coated with the coating composition of the present invention for other applications.

Also other polymers can be coated for other packaging applications. For example suitable copolymers of ethylene and vinyl alcohol suitable for use in the present invention can be prepared by the methods disclosed in U.S. Pat. Nos. 3,510, 464; 3,560,461; 3,847,845; and 3,585,177. Non-limiting examples of other optional polymers which can be used are disclosed in U.S. Pat. Nos. 5,055,355; 3,510,464; 3,560,461; 3,847,845; 5,032,656; 3,585,177; 3,595,740; 4,284,674; 4,058,647; and 4,254,169. All of which are hereby incorporated by reference in their entirety.

Materials that are suitable for the optional adhesive layer 16, include but are not limited to, epoxy modified and unmodified polyolefins, for example, polyethylene, ethylene/x-olefin copolymer, modified and unmodified acrylate resin, preferably selected from, for example, ethylene/vinyl acrylate copolymer, ethylene/ethyl acrylate copolymer, ethylene/butyl acrylate copolymer, and blends thereof.

In FIG. 2 is shown laminate structure 20 having a first polymer layer 12 and coating film 14 and optional adhesive layer 16, and where the first polymer layer 12 is a co-extrusion having a least two different polymers which are different, for example first polymer 22 and second polymer 24. If the first polymer layer is a coextrusion that has direct contact with the coating film 14, the second polymer 24 of the coextrusion may have better adhesive properties to coating film 14 relative to the first polymer 22 to improve adhesion between coating composition 14 and first polymer layer 12. In many cases, depending upon the composition of second polymer 24, the optional adhesive layer 16 may not be needed to achieve a good adhesion between coating film 14 and first polymer layer 12.

FIG. 3 is an exploded view illustration of a laminate structure 30 which includes the components of laminate structure 20 (FIG. 2) and further includes a second polymer layer 32, where coating film 14 is disposed between first polymer layer 12 and second polymer layer 32. The second polymer layer 32 can include any one of the polymers described above with respect to the first polymer layer 12 and second polymer layer 32 can be the same or different than the first polymer layer 12. Optionally, an adhesive layer 36 is disposed between coating film 14 and second polymer layer 32, where adhesive layer 36 can include the adhesives described above with respect to optional adhesive layer 16. The second polymer layer 32 can be a single polymer can also be a coextruded layer (not shown) of two distinct polymers, as described with respect to first polymer layer 12.

In another embodiment, FIG. 3 also shows that laminate structure 30 can further include at least one decorative layer 34 disposed between coating film 14 and second polymer layer 32. Decorative layer 34 can include, for example, an ink layer, a metal layer, a varnish. Additionally, laminate structure 30 can further include a third adhesive layer (not shown) disposed between a coating film 14 and decorative layer 34. The metal film may include titanium, vanadium, chromium, manganese, iron, cobalt, nickel, copper, zinc, aluminum, gold, or palladium, the preferred being aluminum. The film structure can be placed in a metallizing chamber and the metal vapor-deposited on the polyetheramine resin layer surface.

In another embodiment, FIG. 4 shows an exploded view of laminate structure 40 that is similar to laminate structure 30 (FIG. 3), and additionally includes a second decorative layer 42 and optionally, a third adhesive layer 44 disposed between coating film 14 and second polymer layer 32. In the shown example embodiment, laminate structure 40 can include both an ink layer 34 and a metal layer 42, for example. The second decorative layer can include and ink layer or a metal layer. Therefore, laminate structure 40 can include for example, decorative coating 34 which is a metal layer and decorative coating 42 which is an ink layer.

FIG. 5 illustrates an alternative example embodiment in which the first polymer layer 12 is disposed between coating layer 14 and second polymer layer 32. Laminate structure 50 can also include at least one decorative layer, for example, decorative layers 34 and 42 between the first polymer layer 12 and the second polymer layer 32. The decorative layers 34 and 42 can be, for example, an ink layer and a metal layer, respectively. Furthermore, laminate structure 50 can further include at least one adhesive layer, for example, adhesive layer 16 disposed between first polymer layer 12 and coating layer 14, and a second adhesive layer 34, can optionally be disposed between decorative layers 34 and 42.

In the example embodiments described above, the first polymer layer 12 and the second polymer layer 32 can be monoaxially and biaxially oriented. Once the coating is applied to the polymer layer, the coating and the polymer can undergo stretching that changes the surface area of the layer is up to 12 times its original surface area, in an alternative embodiment, from about 6 to 10 times its original surface area, and in another embodiment from about 7 to about 9 times its original surface area, based on the surface area of the polymer layer prior to orientation.

Conventional methods for applying the coating composition of the present invention to substrates include spraying, rolling reverse and direct, rolling direct and reverse gravure, kiss coat, flow coating, brushing, dipping and curtain-wall coating, for example. In roll coating, for example, the coating composition herein can be applied either "in-line" or "off-line." In an "in-line" coating, the coating station is located after the machine stretching process of a monoaxial or biaxial orientation process and dried in a drying oven or using the tenter oven preheating zones as a dryer. In the case of biaxial orientation, the coated monoaxially stretched film is then stretched in the transverse direction. An advantage of this process is that the orientation and coating of the invention can be essentially done in one processing step. In an "out-of-line" coating process, the finished monoaxial or biaxial film is wound up in a roll form, and is mounted on a separate coating machine. The monoaxial or biaxial film substrate may be treated in order that the solution adequately wets the surface. This separate coating line will then apply the solution, dry it, and rewind the finished product.

The coated plastic materials, or sheets are then dried, e.g., in an oven. Drying occurs at a functional temperature less than the functional temperature at which the coating degrades, and preferably operates to drive off the carrier solvent. For instance were the carrier includes polar solvents or mixtures of polar solvents (e.g., a mixture of water and a polar organic compound such as acetone, the carrier is driven off during drying. Also the desired degree of crosslinking from the presence of the aminoplast is effected.

The present invention is further illustrated by the following non-limiting examples. Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. Notwithstanding that the numerical ranges and parameters setting forth the broad scope of the invention are approximations, the numerical values set forth in the specific example are reported as precisely as possible. Any numerical value, however, inherently contains certain errors necessarily resulting from the standard deviation found in their respective testing measurements.

EXAMPLES

Example 1

Deionized water (1095 g) was added to a 3000 ml reaction flask equipped with an overhead stirrer, nitrogen inlet, condenser and temperature controller. Solutions of 85% phosphoric acid (61 g) and 88% lactic acid (11 g) were added to the flask. Defoamer PI-40 (0.033 g) was mixed with Cymel 385 (0.3 g) and then deionized water (0.33 g) was added. The above mixture was added to reactor flask to prevent foaming during heating and holding. The mixture was heated to 45° C. under continuously stirring and 500 g of BLOX 5000 polymer having a mole percent of RDGE of 30-50 was slowly added to the flask. The agitation speed was increased accordingly to prevent polymer from adhering to the flask wall. The mixture was heated to 98° C. and held for five hours. The reaction mixture was slowly cooled to 40° C. There was a broad phase transition between 80° C.-50° C. The polymer solution was transformed to water dispersion. Agitation speed was further reduced to prevent foaming when the reaction mixture was cooling down to room temperature. The average particle size of the dispersion was less than 170 nanometers, and the coating once dried, resulted in a clear plastic film.

Example 2

Deionized water (1095 g) was added to a 3000 ml reaction flask equipped with an overhead stirrer, nitrogen inlet, condenser and temperature controller. Solutions containing 85% phosphoric acid (80 g) and 88% lactic acid (17 g) were added to the flask. Defoamer PI-40 (0.033 g) was mixed with Cymel 385 (0.3 g) and then deionized water (0.33 g) was added. The above mixture was added to reactor flask to prevent foaming during heating and holding. The mixture was heated to 45° C. under continuously stirring. Blox 3000 (300 g, having a mole percent of RDGE of 30) was slowly added to the flask. The agitation speed was increased accordingly to prevent polymer from adhering to the flask wall. The mixture was heated to 98° C. and held for five hours. The reaction mixture was slowly cooled to 40° C. There was a phase transition between 90° C.-70° C. The polymer solution was transformed to water dispersion. Agitation speed was further reduced to prevent foaming when the reaction mixture was cooling down to room temperature. The particle size of water dispersion was less than 160 nanometers.

Example 3

Deionized water (46 lbs.) was added to a 10 gallon steel reactor equipped with an overhead stirrer, nitrogen inlet, condenser and temperature controller. Solutions of 85% phosphoric acid (3.7 lbs) and 88% lactic acid (0.7 lbs) were added to the flask. Defoamer PI-40 (0.92 g) was mixed with Cymel 385 (8.28 g) and then deionized water (9.2 g) was added. The above mixture was added to reactor prevent foaming during heating. The mixture was heated to 55° C. under continuously stirring and 30 lbs. BLOX 5000 polymer having a mole percent of resorinoldiglycidyl ether (RDGE) of 30-50 was slowly added to the reactor. The agitation speed was increased accordingly to prevent polymer from adhering to the reactor wall. The reactor was sealed and then heated with continuous mixing to 125° C. over a period of about 60 minutes. The temperature was maintained at 125° C. for another 4-6 hours. The reactor was monitored very carefully to prevent reflux during the holding period. As soon as the reactor began to reflux, the temperature was reduced until refluxing stopped. After the 4-6 hours hold, heating was turned off to let reactor cool down to 40° C. Pressure was slowly reduced during the cooling. The viscosity decreased as temperature dropped. There was broad phase transition between 80° C.-50° C. The polymer solution was then transformed to water dispersion. Agitation speed was further reduced to prevent foaming when the reaction mixture was cooling down to room temperature. The average particle size of the dispersion was less than 170 nanometers.

Example 4

Deionized water (45 lbs.) was added to a 10 gallon steel reactor equipped with an overhead stirrer, nitrogen inlet, condenser and temperature controller. A solution of 88% lactic acid (2.5 lbs) was added to the flask. Defoamer PI-40 (0.92 g) was mixed with Cymel 385 (8.28 g) and then deionized water (9.2 g) was added. The above mixture was added to reactor prevent foaming during heating. The mixture was heated to 55° C. under continuously stirring and 25 lbs. BLOX 5000 polymer having a mole percent of resorcinol diglycidyl ether (RDGE) of 30-50 was slowly added to the reactor. The agitation speed was increased accordingly to prevent polymer from adhering to the reactor wall. The reactor was sealed and then heated with continuous mixing to 125° C. over a period of about 60 minutes. The temperature was maintained at 125° C. for another 4-6 hours. The reactor was monitored very carefully to prevent reflux during the holding period. As soon as the reactor began to reflux, the temperature was reduced until refluxing stopped. After the 4-6 hours hold, heating was turned off to let reactor cool down. Deionized water (27 lbs) was pumped into reactor. Pressure was slowly reduced during the cooling. Agitation speed was further reduced to prevent foaming when the reaction mixture was cooling down to room temperature. The polymer solution was formed at the room temperature. The particle size of the lactic acid solution was very small, less than 80 nm.

Example 5

Deionized water (46 lbs.) was added to a 10 gallon steel reactor equipped with an overhead stirrer, nitrogen inlet, condenser and temperature controller. A solution of 85% phosphoric acid (3 lbs.) was added to the reactor. Defoamer PI-40 (0.92 g) was mixed with Cymel 385 (8.28 g) and then deionized water (9.2 g) was added. The above mixture was added to reactor prevent foaming during heating. The mixture was heated to 55° C. under continuously stirring and 30 lbs. BLOX 5000 polymer having a mole percent of resorcinol diglycidyl ether (RDGE) of 30-50 was slowly added to the reactor. The agitation speed was increased accordingly to prevent polymer from adhering to the reactor wall. The reactor was sealed and then heated with continuous mixing to 125° C. over a period of about 60 minutes. The temperature was maintained at 125° C. for another 90 minutes. The reactor was monitored very carefully to prevent reflux during the holding period. As soon as the reactor began to reflux, the temperature was reduced until refluxing stopped. After the 90 minutes hold, heating was turned off to let reactor cool down to 90° C. Pressure was slowly reduced during the cooling. The viscosity decreased as temperature dropped. There was one phase transition around 90° C. The polymer solution was transformed to water dispersion. Agitation speed was further reduced to prevent foaming when the reaction mixture was cooling down to room temperature. The particle size of dispersion was 180-250 nm.

Examples 6-10

Several laminate structures were made using the coating compositions of Examples 1 and 2 described above, to coat various substrates of biaxially-oriented polypropylene (BOPP), biaxilly-oriented polyethylene terephthalate (BOPET), and two-layer substrates of metallized biaxially-oriented polypropylene (BOPP), and metallized biaxially-oriented polyethylene terephthalate (BOPET). The coating compositions were cured by drying at 25-30 seconds at 250° F. The laminate substrates were tested for oxygen transmission rate, adhesion and clarity as described below.

In Examples 6-8, the oxygen transmission rate through laminate structures of biaxially-oriented polypropylene (BOPP) with and without the coatings was measured with a Mocon Oxtran 2/20 apparatus equipped with SL sensors. Data was collected as a function of time and recorded in thickness normalized units: cc mil/100 in.$^2$/atm day. The results are listed in Table I.

TABLE I

| Ex. | Laminate Structure | Oxygen Permeation |
| --- | --- | --- |
| 7 | Uncoated 80 guage BOPP | 168 cm.$^3$-mil/100 in.$^2$-atm($O_2$)-day |
| 8 | Coated (0.5 lbs./ream) BOPP (Ex. 1 coating) | 0.33 cm.$^3$-mil/100 in.$^2$-atm($O_2$)-day |
| 9 | Coated (0.5 lbs./ream) BOPP (Ex. 2 coating) | 0.73 cm.$^3$-mil/100 in.$^2$-atm($O_2$)-day |

In Example 9, adhesion of the coating compositions of Examples 1 and 2 applied to substrates of biaxially-oriented polypropylene (BOPP), biaxilly-oriented polyethylene terephthalate (BOPET), and two-layer substrates of metallized biaxially-oriented polypropylene (BOPP), and metallized biaxially-oriented polyethylene terephthalate (BOPET) were tested. Three (3) inches of #600 scotch tape was applied to the coating layer of the laminate structures. The tape was left on each of the substrates for five (5) minutes and then pulled with a jerky motion. The laminate substrates were observed at the taped surfaces for coating removal, and none of the samples appeared to show any missing coating layer removal.

In Example 10, the laminate structures described in Example 9 were visually observed for clarity and all sample laminate structures had a clear coating.

It will be appreciated that the coating composition and laminate structure embodiments described above are presented to enable a person skilled in the art to make and use the invention. Various modifications to the described embodiments will be readily apparent to those skilled in the art, and principles disclosed herein may be applied to other embodiments and applications without departing from the spirit and scope of the invention. Thus, the invention is not intended to be limited to the embodiments shown, but is intended to include such modifications and alterations and is to be accorded the widest scope consistent with the principles and features disclosed herein in so far as they fall within the scope of the appended claims or the equivalents thereof.

We claim:

1. A curable polymeric coating composition comprising:
   at least one of a water dispersion or a solution comprising, by weight:
   from about 70 percent to less than about 100 percent polyetheramine, based on the weight of solids of the coating composition, the polyetheramine prepared by contacting one or more of a diglycidyl ether with a difunctional amine under conditions sufficient to cause the amine moieties to react with epoxy moieties to form a polymer backbone having amine linkages, ether linkages and pendant hydroxyl moieties, and wherein the diglycidyl ethers comprises from about 5 to about 70 mole percent resorcinol diglycidyl ether;
   from about 1 percent to about 30 percent phosphoric acid, based on the weight of solids of the coating composition;
   a defoamer; and
   wherein the coating composition comprises no aminoplast.

2. The coating composition of claim 1, wherein the coating composition comprises:
   from about 10 weight percent to about 90 weight percent solids; and
   from about 90 weight percent to about 10 weight percent carrier, based on the weight of the coating composition.

3. The coating composition of claim 2, wherein the carrier is selected from: water, organic solvents, and mixtures thereof.

4. The coating composition of claim 1, further comprising an alcohol.

5. The coating composition of claim 1, further comprising from about 0.05 weight percent to about 5 weight percent alcohol, based on the weight of solids in the coating composition.

6. The coating composition of claim 5, wherein the alcohol is selected from isopropyl alcohol (isopropanol), ethylene glycol monobutyl ether (EGBE), and mixtures thereof.

7. The coating composition of claim 1, further comprising from greater than zero to up to about 15 weight percent aprotic and protic acid selected from the group of: lactic acid, acetic acid, maleic acid, malic acid, and mixtures thereof, based on the weight of the solids of the coating composition.

8. The coating composition of claim 1, further comprising from greater than zero and up to about 15 weight percent lactic acid, based on the weight of the solids of the coating composition.

9. The coating composition of claim 1, wherein the defoamer comprises a non-aqueous defoamer.

10. The coating composition of claim 9, wherein the defoamer comprises a compound selected from: silicones, alcohols, glycol ethers, mineral spirits, acetylene diols, polysiloxanes, and mixtures thereof.

11. The coating composition of claim 9, wherein the defoamer comprises polysiloxane.

12. The coating composition of claim 1, wherein
   a coating layer comprises a residue of the coating composition,
   wherein the coating layer is disposed between a first polymer layer and a second polymer layer, or the first polymer layer is disposed between the coating layer and the second polymer layer,
   wherein the first polymer layer comprises a polymer selected from the group of: poly(alkyleneterephthalate), polyolefins, polyamide and mixtures thereof; and
   wherein the second polymer layer comprises a polymer selected from the group of: poly(alkyleneterephthalate), polyolefins, polyamide and mixtures thereof.

13. The laminate structure of claim 12, further comprising at least one decorative layer disposed between the coating layer and the second polymer layer.

14. The laminate structure of claim 13, wherein there is no bonding layer between the decorative layer and coating layer.

15. The laminate structure of claim 13, wherein the decorative layer is selected from the group of: an ink layer, a metal layer, and a varnish.

16. The laminate structure of claim 13, wherein the decorative layer is disposed between the coating layer and the second polymer layer, wherein there is no bonding layer between the decorative layer and the first polymer layer, and wherein there is no bonding layer between the coating layer and the decorative layer.

17. The laminate structure of claim 12, wherein the coating layer is applied to at least one of the first polymer layer and the second polymer layer by a method selected from the group of: spraying, roll coating, kiss coating, flow coating, brushing, dipping and curtain roll-coating.

18. The laminate structure of claim 17, wherein the coating layer has undergone stretching such that the coating layer has a surface area that is about 6 to about 10 times its surface area when it was applied to at least one of the first polymer layer and second polymer layer.

19. The laminate structure of claim 12, wherein the coating layer further comprises, based on the weight of the solids of the coating composition, at least one of:
   from about .05 weight percent to about 5 weight percent alcohol; and
   an amount from greater than zero to up to about 15 weight percent lactic acid.

20. The laminate structure of claim 12, further comprising at least one of a crosslinker, an alcohol, or an aprotic or protic acid.

21. The laminate structure of claim 12, wherein the first polymer layer comprises at least two film layers and wherein each of the at least two film layers comprises a polymer which is different.

22. The laminate structure of claim 12, further comprising at least one decorative layer and a bonding layer disposed between the first polymer layer and the coating layer.

23. The laminate structure of claim 12, wherein the first polymer layer and the second polymer layer are substrates.

24. A curable polymeric coating composition comprising:
least one of a water dispersion or a solution comprising, by weight:
from about 70 percent to less than about 100 percent polyetheramine, based on the weight of solids of the coating composition, the polyetheramine prepared by contacting one or more of a diglycidyl ether with a difunctional amine under conditions sufficient to cause the amine moieties to react with epoxy moieties to form a polymer backbone having amine linkages, ether linkages and pendant hydroxyl moieties, and
wherein the diglycidyl ether comprises from about 10 to about 50 mole percent resorcinol diglycidyl ether;
from about 1 percent to about 30 percent phosphoric acid, based on the weight of solids of the coating composition;
a defoamer; and
from about 0.05 weight percent to about 5 weight percent alcohol, based on the weight of solids in the coating composition; and
wherein the coating composition comprises no aminoplast.

25. The coating composition of claim 24, further comprising:
an amount from greater than zero to up to about 15 weight percent lactic acid, based on the weight of the solids of the coating composition; and
from about 0.05 weight percent to about 5 weight percent alcohol,
wherein the alcohol is selected from isopropyl alcohol (isopropanol), ethylene glycol monobutyl ether (EGBE), and mixtures thereof; and
wherein the defoamer comprises polysiloxane.

* * * * *